(12) United States Patent
Bialer et al.

(10) Patent No.: US 11,187,782 B2
(45) Date of Patent: Nov. 30, 2021

(54) RADAR SYSTEM WITH ENHANCED ANGULAR RESOLUTION AND METHOD FOR ENHANCING ANGULAR RESOLUTION IN A RADAR SYSTEM

(71) Applicant: GM GLOBAL TECHNOLOGY OPERATIONS LLC, Detroit, MI (US)

(72) Inventors: Oded Bialer, Petah Tivak (IL); Sammy Kolpinizki, Raanana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 442 days.

(21) Appl. No.: 16/380,498

(22) Filed: Apr. 10, 2019

(65) Prior Publication Data
US 2020/0326408 A1   Oct. 15, 2020

(51) Int. Cl.
| | | |
|---|---|---|
| *G01S 7/285* | (2006.01) | |
| *G01S 7/282* | (2006.01) | |
| *G01S 13/10* | (2006.01) | |
| *G01S 13/931* | (2020.01) | |
| *G01S 7/41* | (2006.01) | |

(52) U.S. Cl.
CPC .............. *G01S 7/285* (2013.01); *G01S 7/282* (2013.01); *G01S 7/41* (2013.01); *G01S 13/10* (2013.01); *G01S 13/931* (2013.01)

(58) Field of Classification Search
CPC ............ G01S 7/285; G01S 7/282; G01S 7/41; G01S 13/10; G01S 13/931
USPC .......................................................... 342/70
See application file for complete search history.

(56) References Cited

U.S. PATENT DOCUMENTS

| | | | | |
|---|---|---|---|---|
| 4,845,502 A | * | 7/1989 | Carr ........................... | G01S 3/46 342/430 |
| 7,714,782 B2 | * | 5/2010 | Davis ......................... | G01S 3/74 342/377 |
| 7,898,460 B2 | * | 3/2011 | Nishimura ................ | G01S 3/48 342/27 |
| 9,007,258 B2 | * | 4/2015 | Kurono ................. | G01S 13/345 342/147 |
| 9,829,568 B2 | * | 11/2017 | Woodsum ............... | G01S 7/415 |
| 9,939,522 B2 | * | 4/2018 | Hong ....................... | G01S 13/42 |
| 10,222,463 B2 | * | 3/2019 | Hong .................... | G01S 13/584 |

(Continued)

FOREIGN PATENT DOCUMENTS

| | | | | |
|---|---|---|---|---|
| EP | 2048514 A1 | * | 4/2009 | ............... G01S 3/48 |
| WO | WO-2015105592 A2 | * | 7/2015 | ............... G01S 5/04 |

*Primary Examiner* — Bernarr E Gregory
*Assistant Examiner* — Nuzhat Pervin
(74) *Attorney, Agent, or Firm* — Cantor Colburn LLP (57) ABSTRACT

A radar system may include an antenna structured to transmit a radar signal and receive reflected radar signals from targets and a processor operably connected to the antenna. The radar system may receive a first reflected signal, having a first arrival angle, at a first time. The radar system may receive a second reflected signal, having a second arrival angle at a second time. The second arrival angle may be equal to the first arrival angle plus an angle offset calculated based on a velocity hypothesis. The radar system may translate the first vector by applying the angle offset, thereby calculating a translated first vector. The radar system may calculate a beamforming spectrum based on the translated first vector and the second vector. The radar system may identify peaks in the beamforming spectrum to identify angular positions of multiple targets.

18 Claims, 9 Drawing Sheets

(56) References Cited

U.S. PATENT DOCUMENTS

| | | | |
|---|---|---|---|
| 10,509,119 B2* | 12/2019 | Hong | G01S 13/723 |
| 10,620,304 B2* | 4/2020 | Halbert | G01S 13/003 |
| 2005/0179579 A1* | 8/2005 | Pinder | G01S 7/2926 |
| | | | 342/25 R |
| 2009/0231182 A1* | 9/2009 | Nishimura | G01S 3/48 |
| | | | 342/70 |
| 2015/0145716 A1* | 5/2015 | Woodsum | G01S 3/74 |
| | | | 342/146 |
| 2017/0117946 A1* | 4/2017 | Lee | G01S 7/4021 |
| 2018/0024235 A1* | 1/2018 | Hong | G01S 13/87 |
| | | | 342/59 |
| 2018/0188365 A1* | 7/2018 | Hong | G01S 13/87 |
| 2019/0056506 A1* | 2/2019 | Bialer | G01S 7/4004 |
| 2019/0317191 A1* | 10/2019 | Santra | G01S 13/86 |
| 2020/0116850 A1* | 4/2020 | Santra | G01S 13/72 |
| 2020/0300965 A1* | 9/2020 | Wu | G01S 13/931 |
| 2020/0300995 A1* | 9/2020 | Wu | G01S 13/04 |

\* cited by examiner

RADAR SYSTEM WITH ENHANCED ANGULAR RESOLUTION AND METHOD FOR ENHANCING ANGULAR RESOLUTION IN A RADAR SYSTEM

INTRODUCTION

The subject disclosure relates to a system and method for improving angular resolution in a radar system.

Radar systems in general are robust in adverse weather conditions and have a large detection range. However, the angular resolution of radar systems is less suitable for autonomous vehicle operation, in comparison to a Light Detection and Ranging (LIDAR) system. Accordingly, because LIDAR systems are not as robust in adverse weather conditions, it may be difficult to implement an autonomous vehicle that can operate satisfactorily in adverse weather conditions.

Accordingly, it may be desirable to provide a radar system with enhanced angular resolution, a method for enhancing angular resolution of a radar system, and a vehicle implementing such a radar system or method in conjunction with an automated driving system.

SUMMARY

In one exemplary embodiment, a radar system for use with multiple targets when there is relative motion between the radar system and the multiple targets may include an antenna structured to transmit a radar signal and receive reflected radar signals from targets and a processor operably connected to the antenna. The processor may be configured to control the radar system to perform receiving a first reflected signal at a first time. The first reflected signal may be characterized by a first vector having a first set of arrival angles. The processor may be further configured to control the radar system to perform receiving a second reflected signal at a second time. The second reflected signal may be characterized by a second vector having a second set of arrival angles. The second set of arrival angles may be equal to the first set of arrival angles plus an angle offset which is calculated based on a velocity hypothesis. The processor may be configured to control the radar system to perform translating the first vector by applying the angle offset, thereby calculating a translated first vector. The processor may be configured to control the radar system to perform calculating a beamforming spectrum based on the translated first vector and the second vector. The processor may be configured to control the radar system to perform identifying peaks in the beamforming spectrum to identify angular positions of the multiple targets.

In another exemplary embodiment of the radar system, the processor may be configured such that the identifying peaks in the beamforming spectrum includes calculating a velocity score of the beamforming spectrum and iteratively adjusting the velocity hypothesis until an optimal velocity hypothesis is determined. The optimal velocity hypothesis may be a velocity hypothesis for which the velocity score of the beamforming spectrum reaches a minimum velocity score, and an optimal beamforming spectrum may be a beamforming spectrum generated using the optimal velocity hypothesis. The processor may be further configured to control the radar system to perform identifying peaks in the optimal beamforming spectrum to identify angular positions of the multiple targets.

In another exemplary embodiment of the radar system, the first vector may be given by the equation $y_1 = \Sigma_{m=0}^{M-1} a(\theta_m) c_m + v_1$. $y_1$ is the first vector, M is the number of reflections, $\theta_m$ is the first set of arrival angles, $a(\theta_m) = [e^{-j2\pi/\lambda x_1 \sin \theta_m} \ldots e^{-j2\pi/\lambda x_N \sin \theta_m}]^T$ is the array response at angle $\theta_m$ where $\lambda$ is a wavelength and $x_i$ is the i-th antenna position; $c_m$ is a complex reflection coefficient for the signal arriving from angle $\theta_m$, and $v_1$ is a first noise factor. The second vector may be given by the equation: $y_2 = \Sigma_{m=0}^{M-1} a(\theta_m + \Delta) b_m + v_2$. $y_2$ is the second vector, $\Delta$ is the angle offset, $a(\theta_m + \Delta)$ is an array response at angle $\theta_m + \Delta$, and $b_m$ is a second complex reflector coefficient, and $v_2$ is a second noise factor.

In another exemplary embodiment of the radar system, the translated first vector may be given by the equation $\bar{y}_1 = G(\Delta) y_1 \approx \Sigma_{m=0}^{M-1} a(\theta_m + \Delta) c_m + v_1$. $\bar{y}_1$ is the translated first vector, and $G(\Delta)$ is a diagonal matrix given by the equation $G(\Delta) = \mathrm{diag}\{e^{j2\pi x_1 \sin \Delta/\lambda}, \ldots, e^{j2\pi x_N \sin \Delta/\lambda}\}$. The radar system may include N antenna elements, $\lambda$ is the wavelength; and $x_1, x_2, \ldots, x_N$ are positions of the N antenna elements.

In another exemplary embodiment of the radar system, the beamforming spectrum may be given by the equation $$P(\theta) = \frac{1}{a^H(\theta)(R + \sigma I)^{-1} a(\theta)}$$

$P(\theta)$ is the beamforming spectrum, $a(\theta)$ is an array response at angle $\theta$, $\sigma$ is a regularization factor, I is an identity matrix, superscript H represents a Hermitian transpose, and R is given by the equation $R = \bar{y}_1 \bar{y}_1^H + y_2 y_2^H$. $\bar{y}_1$ is the translated first vector and $y_2$ is the second vector.

In another exemplary embodiment of the radar system, the velocity score may be given by the equation $S_E = E - \alpha \Sigma_\theta |P(\theta)|^2$ wherein $P(\theta)$ is the beamforming spectrum; $\alpha$ is weighting factor given for example by the equation:

$$\alpha = \frac{0.25 \log(N)}{\max_\theta (P(\theta))},$$

wherein N is the number of beamforming angles; and E is given by the equation $E = \Sigma_\theta \gamma_\theta \log(\gamma_\theta)$. $\gamma_\theta$ is given by the equation $$\gamma_\theta = \frac{|P(\theta)|^2}{\Sigma_\theta |P(\theta)|^2}.$$

In another exemplary embodiment of the radar system, the processor may be further configured to output the optimal velocity hypothesis as an estimated velocity vector corresponding to relative motion between the radar system and the multiple targets. The processor may be further configured to output angles corresponding to the peaks in the optimal beamforming spectrum as an estimated angular location of the multiple targets.

In another exemplary embodiment of the radar system, the antenna and the processor may be provided in a vehicle comprising an automated driving system operably connected to the radar system. The automated driving system may be structured to autonomously control the vehicle. The processor may be configured to transmit the estimated velocity vector and the estimated angular positions of the multiple targets to the automated driving system. The automated driving system may be structured to control operation of the vehicle based on the estimated velocity vector and the estimated angular positions of the multiple targets.

In one exemplary embodiment, a vehicle may include an automated driving system structured to autonomously control the vehicle. The vehicle may further include a radar system operably connected to the automated driving system. The radar system may be structured for use with multiple targets when there is relative motion between the radar system and the multiple targets. The radar system may include an antenna structured to transmit a radar signal and receive reflected radar signals from targets and a processor operably connected to the antenna. The processor may be configured to control the radar system to perform receiving a first reflected signal at a first time. The first reflected signal may be characterized by a first vector having a first set of arrival angles. The processor may be further configured to perform receiving a second reflected signal at a second time. The second reflected signal may be characterized by a second vector having a second set of arrival angles. The second set of arrival angles may be equal to the first set of arrival angles plus an angle offset which is calculated based on a velocity hypothesis. The processor may be further configured to perform translating the first vector by applying the angle offset, thereby calculating a translated first vector. The processor may be further configured to perform calculating a beamforming spectrum based on the translated first vector and the second vector. The processor may be further configured to perform identifying peaks in the beamforming spectrum to identify angular positions of the multiple targets. The processor may be further configured to perform transmitting the velocity hypothesis to the autonomous driving system as an estimated velocity vector. The processor may be further configured to perform transmitting the angular positions of the multiple targets to the autonomous driving system. The automated driving system may be structured to control operation of the vehicle based on the estimated velocity vector and the angular positions of the multiple targets.

In another exemplary embodiment of the vehicle, the processor may be configured such that the identifying peaks in the beamforming spectrum includes calculating a velocity score of the beamforming spectrum and iteratively adjusting the velocity hypothesis until an optimal velocity hypothesis is determined. The optimal velocity hypothesis may be a velocity hypothesis for which the velocity score of the beamforming spectrum reaches a minimum velocity score, and an optimal beamforming spectrum being a beamforming spectrum generated using the optimal velocity hypothesis. The processor may be further configured to perform identifying peaks in the optimal beamforming spectrum to identify angular positions of the multiple targets.

In one exemplary embodiment, a beamforming method for a radar system for use with multiple targets when there is relative motion between the radar system and the multiple targets may include receiving, with the radar system, a first reflected signal at a first time. The first reflected signal may be characterized by a first vector having a first set of arrival angles. The beamforming method may further include receiving, with the radar system, a second reflected signal at a second time. The second reflected signal may be characterized by a second vector having a second set of arrival angles. The second set of arrival angles may be equal to the first set of arrival angles plus an angle offset which is calculated based on a velocity hypothesis. The beamforming method may further include translating the first vector by applying the angle offset, thereby calculating a translated first vector. The beamforming method may include calculating a beamforming spectrum based on the translated first vector and the second vector. The beamforming method may further include identifying peaks in the beamforming spectrum to identify angular positions of the multiple targets.

In another exemplary embodiment of the beamforming method, the identifying peaks in the beamforming spectrum may include calculating a velocity score of the beamforming spectrum and iteratively adjusting the velocity hypothesis until an optimal velocity hypothesis is determined. The optimal velocity hypothesis may be a velocity hypothesis for which the velocity score of the beamforming spectrum reaches a minimum velocity score. The optimal beamforming spectrum may be a beamforming spectrum generated using the optimal velocity hypothesis. The identifying peaks in the beamforming spectrum may further include identifying peaks in the optimal beamforming spectrum to identify angular positions of the multiple targets.

In another exemplary embodiment of the beamforming method, the first vector may be given by the equation $y_1 = \sum_{m=0}^{M-1} a(\theta_m) c_m + v_1$. $y_1$ is the first vector, M is the number of reflections, and $\theta_m$ is the $m^{th}$ arrival angle. $a(\theta_m) = [e^{-j2\pi/\lambda x_1 \sin \theta_m} \ldots e^{-j2\pi/\lambda x_N \sin \theta_m}]^T$ is the array response at angle $\theta_m$ where $\lambda$ is the wavelength and $x_i$ is the i-th antenna position. $c_m$ is a complex reflector coefficient for the signal arriving from angle $\theta_m$, and $v_1$ is a first noise factor. The second vector may be given by the equation $y_2 = \sum_{m=0}^{M-1} a(\theta_m + \Delta) b_m + v_2$. $y_2$ is the second vector, $\Delta$ is the angle offset, $a(\theta_m + \Delta)$ is an array response at angle $\theta_m + \Delta$, $b_m$ is a complex reflector coefficient for the signal arriving from angle $\theta_m + \Delta$, and $v_2$ is a second noise factor.

In another exemplary embodiment of the beamforming method, the translated first vector may be given by the equation $\bar{y}_1 = G(\Delta) y_1 \approx \sum_{m=0}^{M-1} a(\theta_m + \Delta) c_m + v_1$. $\bar{y}_1$ is the translated first vector, and $G(\Delta)$ is a diagonal matrix by the equation $G(\Delta) = \text{diag}\{e^{j2\pi x_1 \sin \Delta/\lambda}, \ldots, e^{j2\pi x_N \sin \Delta/\lambda}\}$. The radar system may include N antenna elements, $\lambda$ is the wavelength; and $x_1, x_2, \ldots, x_N$ are positions of the N antenna elements.

In another exemplary embodiment of the beamforming method, the beamforming spectrum may be given by the equation $$P(\theta) = \frac{1}{a^H(\theta)(R + \sigma I)^{-1} a(\theta)}.$$

$P(\theta)$ is the beamforming spectrum, $a(\theta)$ is an array response at angle $\theta$, $\sigma$ is a regularization factor, I is the identity matrix, superscript H represents a Hermitian transpose, and R is given by the equation. $R = \bar{y}_1 \bar{y}_1^H + y_2 y_2^H$. $\bar{y}_1$ is the translated first vector and $y_2$ is the second vector.

In another exemplary embodiment of the beamforming method, the velocity score may be given by the equation $S_E = E - \alpha \sum_\theta |P(\theta)|^2$. $P(\theta)$ is the beamforming spectrum. $\alpha$ is a weighting factor given for example by the equation $$\alpha = \frac{0.25 \log(N)}{\max_\theta (P(\theta))},$$

wherein N is the number of beamforming angles (the beamforming grid points); and E is given by the equation $E = -\sum_\theta \gamma_\theta \log(\gamma_\theta)$. $\gamma_\theta$ is given by the equation $$\gamma_\theta = \frac{|P(\theta)|^2}{\Sigma_\theta |P(\theta)|^2}.$$

In another exemplary embodiment of the beamforming method, the optimal velocity hypothesis, which yields the lowest velocity score, may be reported as an estimated velocity vector corresponding to relative motion between the radar system and the multiple targets. Angles corresponding to the peaks in the optimal beamforming spectrum are reported as the estimated angular location of the multiple targets.

In another exemplary embodiment of the beamforming method, the beamforming method may include providing the radar system in a vehicle comprising an automated driving system operably connected to the radar system. The automated driving system may be structured to autonomously control the vehicle. The beamforming method may further include transmitting the estimated velocity vector and the estimated angular positions of the multiple targets to the automated driving system. The beamforming method may further include controlling operation of the vehicle based on the estimated velocity vector and the estimated angular positions of the multiple targets.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
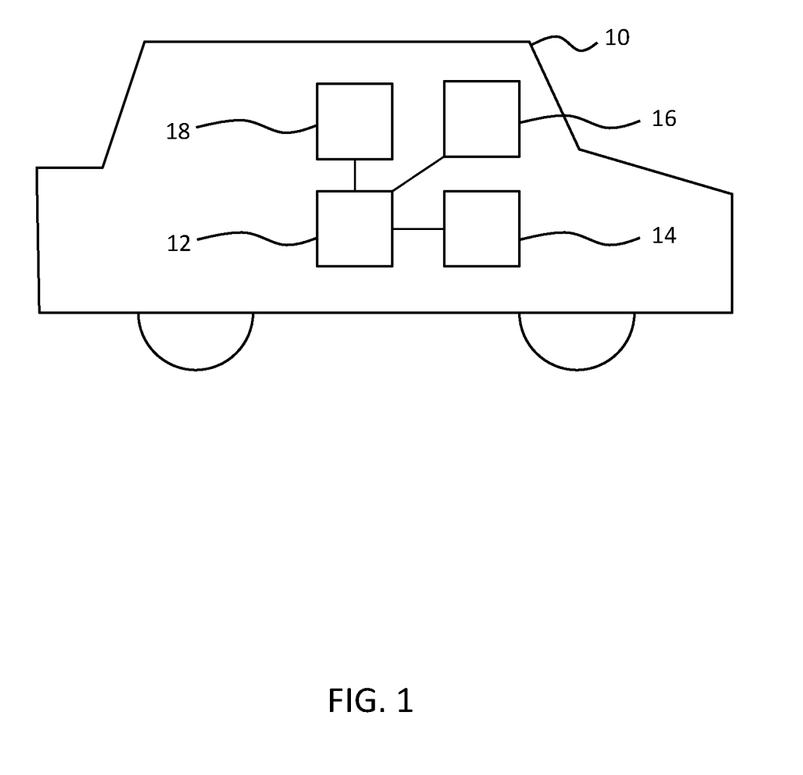
FIG. 1 is a schematic diagram of a vehicle according to an exemplary embodiment.

FIG. 1 shows an exemplary embodiment of a vehicle 10 including an automated driving system 12 and radar system 14. Automated driving system 12 may be operably connected to radar system 14, and may also include or be operably connected to additional sensors 16 configured to detect a driving environment. Sensors 16 may include a camera, an additional radar system, a LIDAR system, or any combination of these systems. In response to driving environment information detected by radar system 14 and/or sensors 16, automated driving system 12 may calculate a vehicle path plan for vehicle 10.

Automated driving system 12 may further include or be operably connected to vehicle controllers 18 configured to control speed, acceleration, braking, steering, or other operations necessary for operating vehicle 10. Automated driving system 12 may control vehicle controllers 18 to operate vehicle 10 according to the calculated vehicle path plan. It will be understood that vehicle 10 may be a fully autonomous vehicle in which automated driving system controls 12 all aspects of the vehicle operation, or vehicle 10 may be a vehicle in which the driver retains some autonomous control and automated driving system 12 is part of a driver assist system configured to assist with a subset of vehicle operations.

Figure 2:
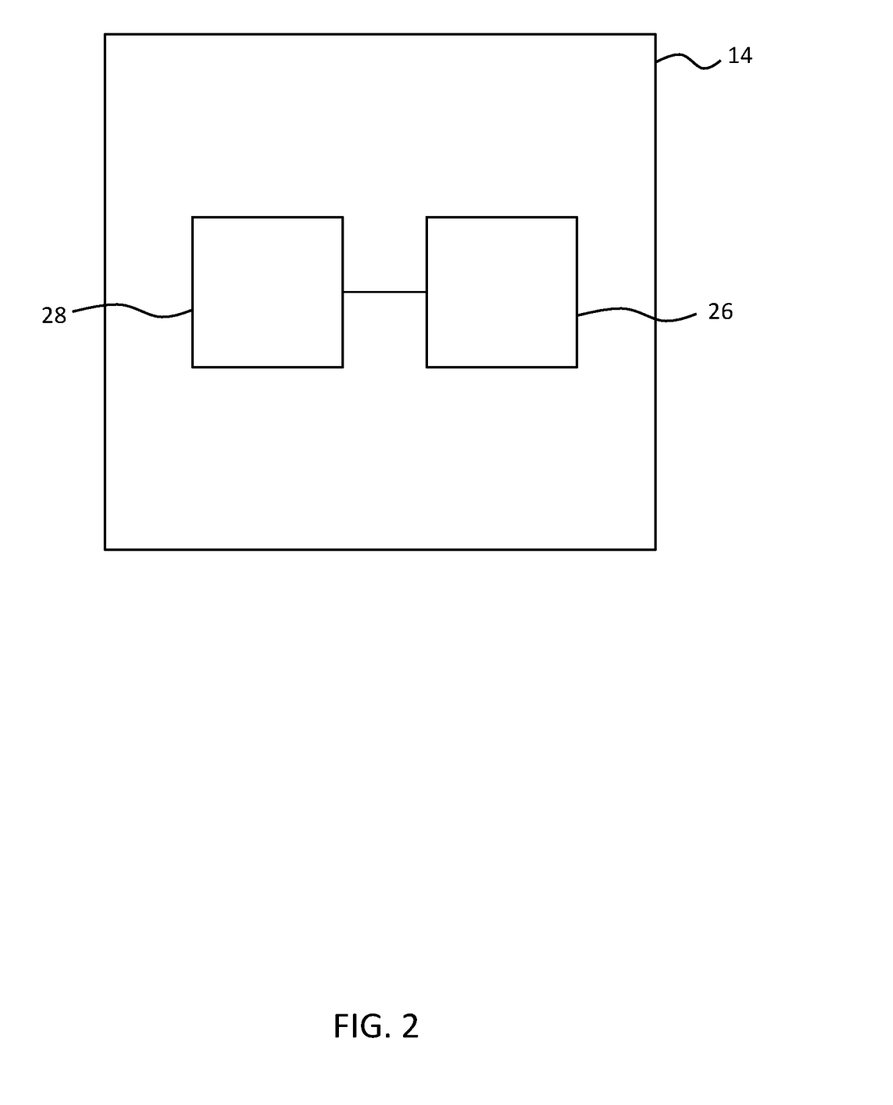
FIG. 2 is a schematic diagram of a radar system according to an exemplary embodiment.

FIG. 2 shows an exemplary embodiment of radar system 14. Radar system 14 may include an antenna 26 structured to transmit a radar signal and receive reflected radar signals from targets. Radar system 14 may further include a processor 28 operably connected to antenna 26 and configured to operate on signals received by antenna 26.

Figure 3:
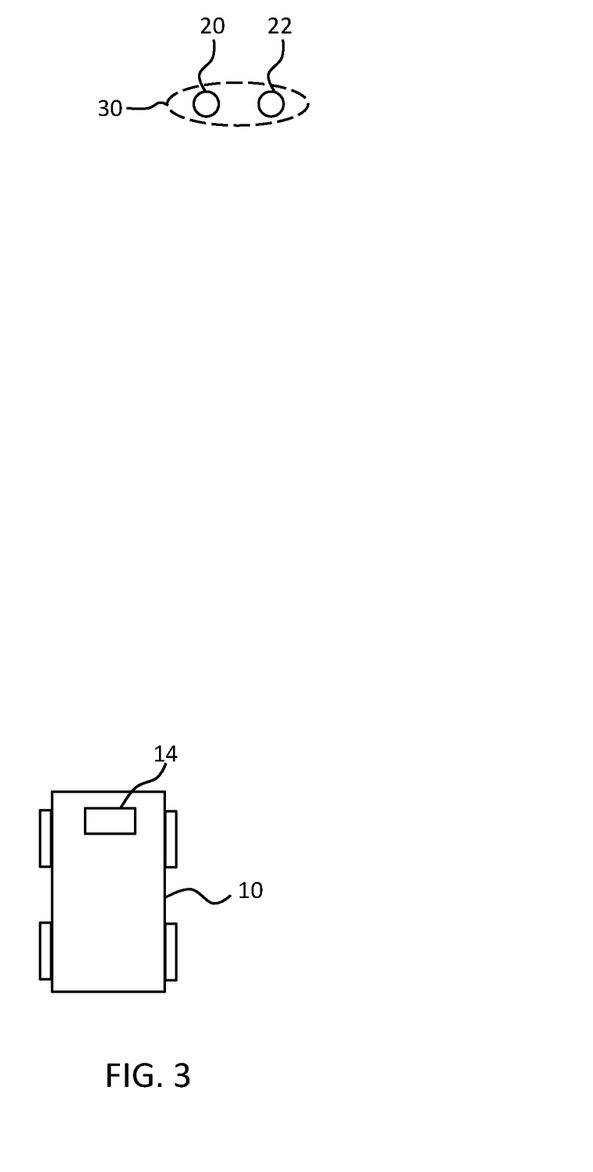
FIG. 3 is a schematic diagram showing a vehicle and detection targets according to an exemplary embodiment.

FIG. 3 shows an exemplary embodiment in which radar system 14 of vehicle 10 may be used to detect a first detection target 20 and a second detection target 22. Detection targets 20, 22 may represent potential obstacles to operation of the vehicle, such as other vehicles, pedestrians, bicyclists, or landscape features. Radar system 14 will have a characteristic angular resolution indicated by angular resolution cell 30. In other words, even though detection targets 20, 22 will give multiple reflections radar system 14 will be unable to resolve detection targets 20, 22 as separate targets due to the angular resolution of radar system 14, and instead radar system 14 will only detect a single target.

Figure 4:
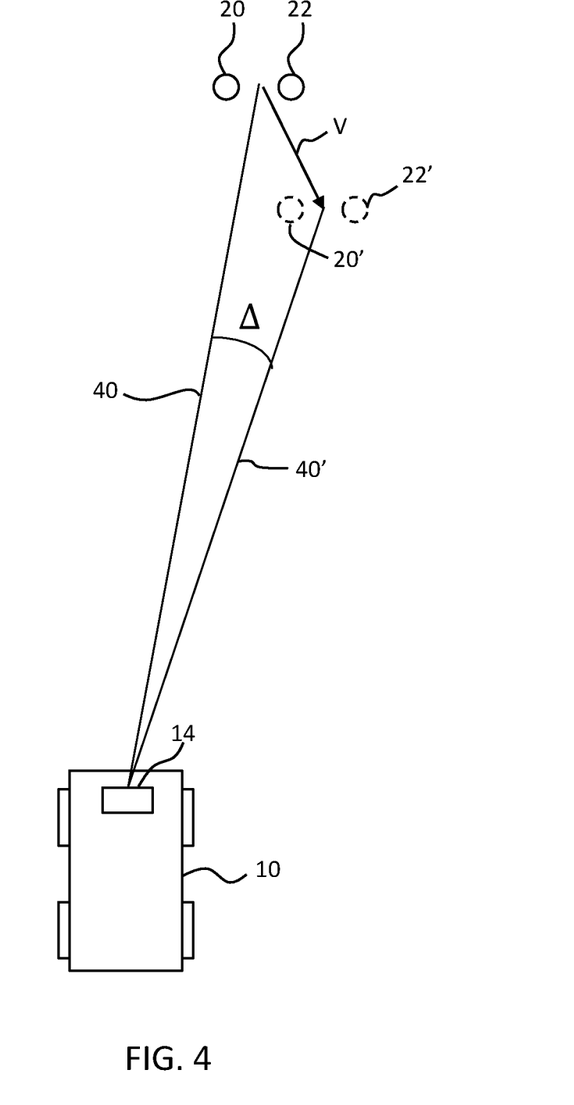
FIG. 4 is a schematic diagram showing relative motion between a vehicle and detection targets according to an exemplary embodiment.

FIG. 4 shows an exemplary embodiment in which there is relative motion between vehicle 10, including radar system 14, and first and second detection targets 20, 22. The relative motion may be due to motion of the vehicle 10, motion of detection targets 20, 22, or a combination of both, and is represented in FIG. 4 by vector V. Detection targets 20, 22 represent positions relative to vehicle 10 at time $t_1$, and detection targets 20', 22' represent positions relative to vehicle 10 at time $t_2$ after the relative motion between vehicle 10 and detection targets 20, 22. Vector 40 represents the reflection from detection targets 20, 22 received by radar system 14 at time $t_1$, and vector 40' represents the reflection from detection targets 20', 22' received by radar system 14 at time $t_2$. As explained in detail herein, vectors 40, 40' can be used to individually resolve angular positions of first detection target 20 and second detection target 22 even though first detection target 20 and second detection target 22 are both within an angular resolution cell of radar system 14.

Figure 5:
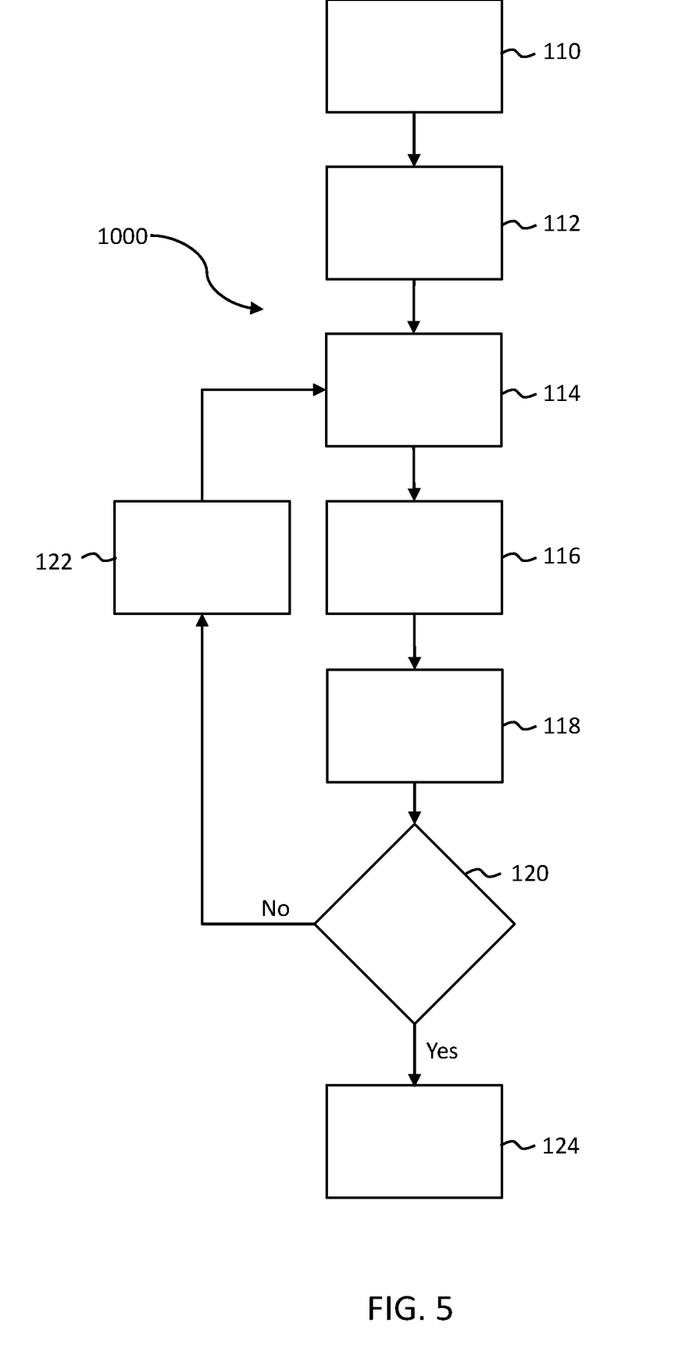
FIG. 5 is a flowchart illustrating an exemplary embodiment of a beamforming method.

FIG. 5 shows an exemplary embodiment of a beamforming method 1000 for individually resolving angular positions of first detection target 20 and second detection target 22. In block 110, radar system 14 receives a first reflected signal from detection targets 20, 22 at time $t_1$. The first reflected signal may be characterized by a first vector 40 having a first arrival angles. First vector 40 may be given by the following equation:

$$y_1 = \sum_{m=0}^{M-1} a(\theta_m) c_m + v_1 \quad (1);$$

where $y_1$ is the first vector, M is the number of reflection angles, $\theta_m$ is the m-th index angle of arrival, $a(\theta_m)$ is an array response at angle $\theta_m$ given by $a(\theta_m) = [e^{-j2\pi/\lambda x_1 \sin \theta_m} \ldots e^{-j2\pi/\lambda x_N \sin \theta_m}]^T$ where $\lambda$ is the wavelength and $x_i$ is the i-th antenna position; $c_m$ is the complex reflector coefficient of the m-th angle of arrival, and $v_1$ is a first noise factor.

In block 112, radar system 14 receives a second reflected signal from detection targets 20', 22' at time $t_2$. The second reflected signal may be characterized by a second vector 40 having a second set of arrival angles, the second set of arrival angles being equal to the first set of arrival angles plus an angle offset $\Delta$. Angle offset $\Delta$ can be calculated by an initial velocity hypothesis for velocity vector V. The initial velocity may be calculated from instrumentation of the vehicle, such as a speed sensor, GPS or other suitable instruments, or may be based on a previously calculated velocity hypothesis of vehicle 10. Second vector 40' may be given by the following equation:

$$y_2 = \sum_{m=0}^{M-1} a(\theta_m + \Delta) b_m + v_2 \quad (2);$$

where $y_2$ is the second vector 40', $a(\theta_m + \Delta)$ is an array response at angle $\theta_m + \Delta$, $b_m$ is a the complex reflector coefficient of the reflection from angle $\theta_m + \Delta$, and $v_2$ is a second noise factor.

In block 114, a translated first vector is calculated by applying the angle offset to the first vector 40. Translated first vector may be given by the following equation (3):

$$\bar{y}_1 = G(\Delta) y_1 \approx \sum_{m=0}^{M-1} a(\theta_m + \Delta) c_m + v_1 \quad (3);$$

where $\bar{y}_1$ is the translated first vector, and $G(\Delta)$ is a diagonal matrix given by the following equation:

$$G(\Delta) = \text{diag}\{e^{j2\pi/\lambda x_1 \sin \Delta}, \ldots, e^{j2\pi/\lambda x_N \sin \Delta}\} \quad (4);$$

where N is a number of antenna elements provided in radar system 14, $\lambda$ is the wavelength, and $x_1, x_2, \ldots, x_N$ are positions of the N antenna elements.

In block 116, a beamforming spectrum is calculated based on the translated first vector $\bar{y}_1$ and second vector $y_2$. For a small angle offset $\Delta$, translated first vector $\bar{y}_1$ and second $y_2$ should be approximately a sum of the same array response signals $a(\theta_m)$ but with different complex reflector coefficients. To form a beamforming spectrum based on $\bar{y}_1$ and $y_2$ to some angle $\theta$, one can find a solution that attains minimum variance between them. The beamforming spectrum is found by solving the following equation:

$$P(\theta) = \min_w |w^H \bar{y}_1 + w^H y_2|^2; \text{ Subjected to } w^H a(\theta) = 1 \quad (5);$$

where $P(\theta)$ is the beamforming spectrum at angle $\theta$, w is a vector variable, which is optimized for each angle $\theta$, and the superscript represents a Hermitian transpose operation. Equation (5) is solved by finding the vector w that results in a minimum value, assuming that $w^H a(\theta) = 1$ (representing a gain of 1 at angle $\theta$). Solving equation 5 gives the following equation:

$$P(\theta) = \frac{1}{a^H(\theta)(R + \sigma I)^{-1} a(\theta)}; \quad (6)$$

where $\sigma$ is a regularization factor, I is an identity matrix, superscript H represents a Hermitian transpose, and R is given by the equation:

$$R = \bar{y}_1 \bar{y}_1^H + y_2 y_2^H. \quad (7)$$

Figure 6:
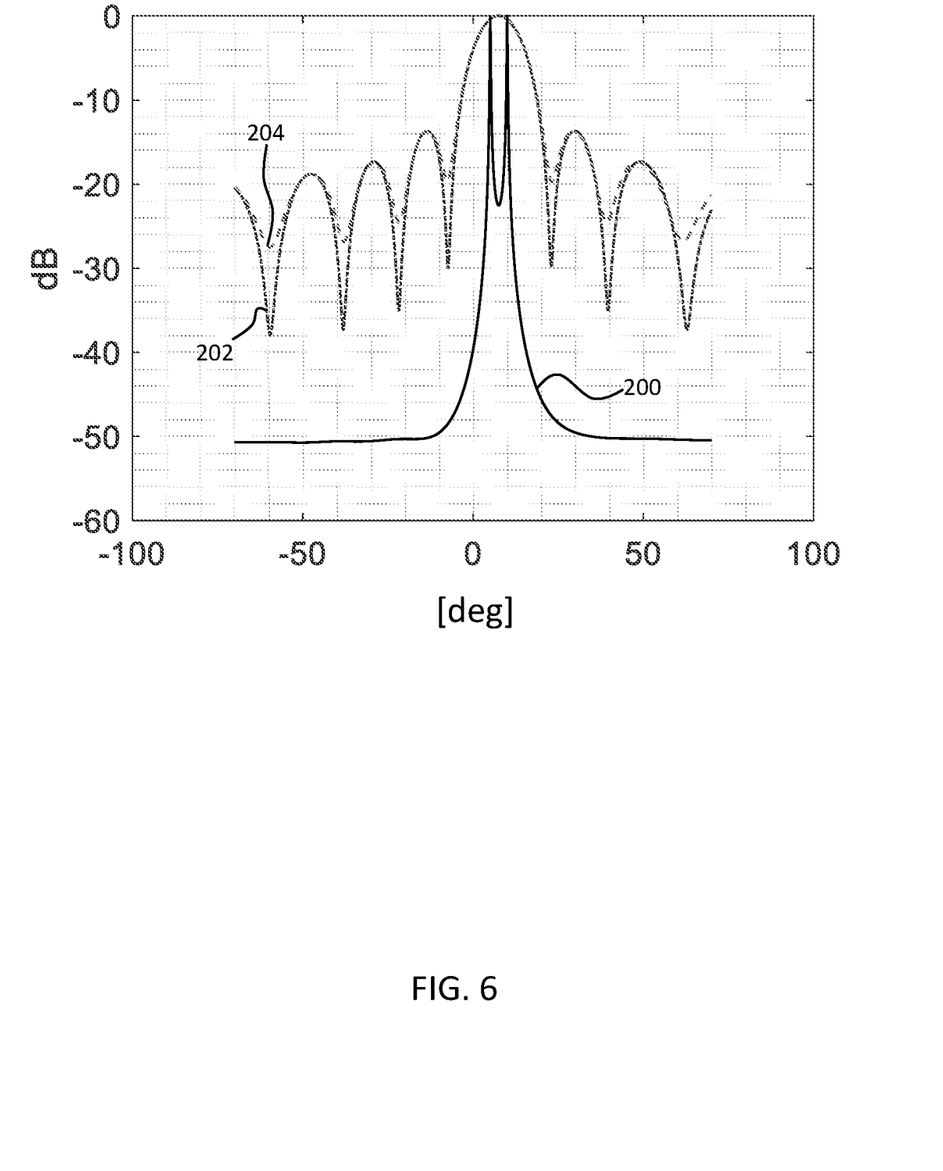
FIG. 6 is a graph showing beamforming spectra according to an exemplary embodiment.

FIG. 6 shows an exemplary embodiment of a beamforming spectrum 200 generated by equation (6). For comparison, graphs 202, 204 represent Bartlett beamforming spectrum calculated at time $t_1$ and $t_2$ without using the translated first vector. As seen in FIG. 6, beamforming spectrum has two very apparent peaks, corresponding to angular locations of first detection target 20 and second detection target 22.

Figure 7:
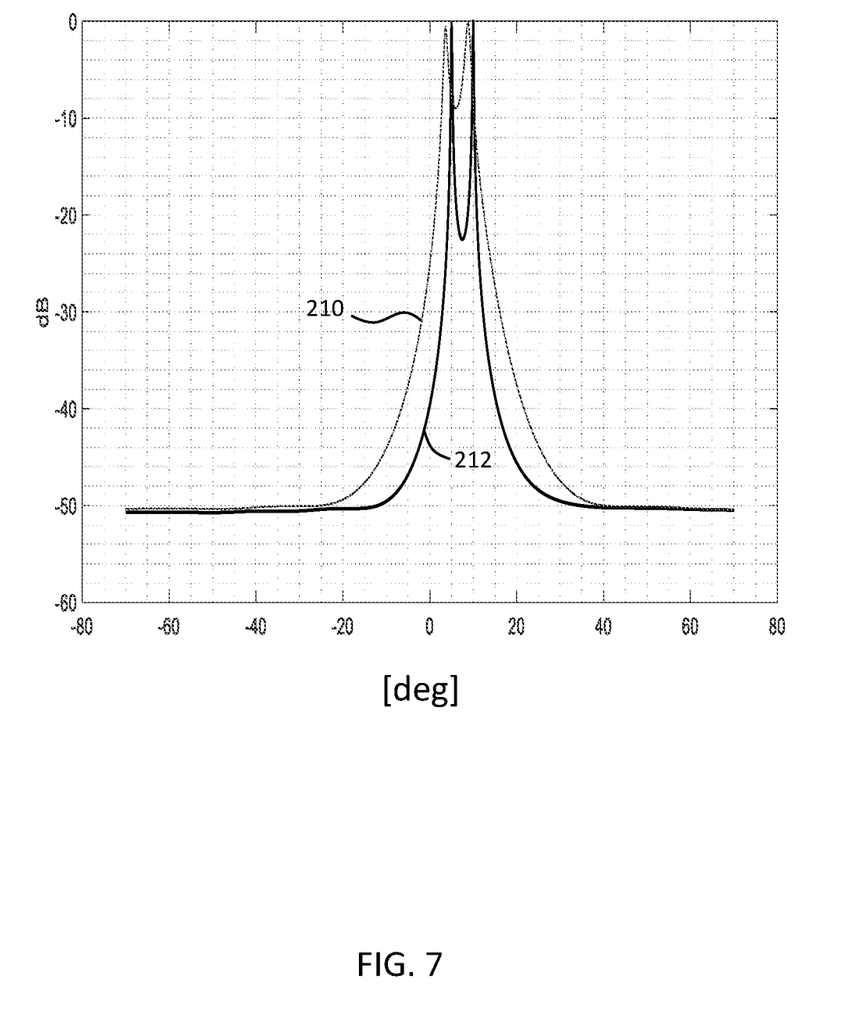
FIG. 7 is a graph showing beamforming spectra according to an exemplary embodiment.

However, if there is an error in the velocity hypothesis, the peaks in beamforming spectrum 200 may be inaccurate and may not be sharply defined. FIG. 7 shows an exemplary embodiment of an initial beamforming spectrum 210 calculated with a velocity error compared to an optimal beamforming spectrum 212 with accurate velocity. To achieve the optimal beamforming spectrum 212, the velocity hypothesis is iteratively adjusted, as described in detail herein.

In block 118 of FIG. 5, a velocity score $S_E$ is calculated for the beamforming spectrum calculated in block 116. The velocity score $S_E$ is given by the following equation:

$$S_E = E - \alpha Z_\theta |P(\theta)|^2 \quad (8).$$

$\alpha$ is a normalization factor that can be given by the equation:

$$\alpha = \frac{0.25 \log(N)}{\max_\theta (P(\theta))}; \quad (9)$$

where N is the number of beamforming angles (the beamforming grid points); E is given by the equation:

$$E = -\Sigma_\theta \gamma_\theta \log(\gamma_\theta) \quad (10).$$

$\gamma_\theta$ is given by the equation:

$$\gamma_\theta = \frac{|P(\theta)|^2}{\Sigma_\theta |P(\theta)|^2}. \quad (11)$$

In block 120, it is determined whether a minimum velocity score has been identified. If a minimum velocity score has been identified ("Yes" in block 120), then the method proceeds to block 124. If no minimum velocity score has been identified ("No" in block 120), then the method proceeds to block 122.

In block 122, the velocity hypothesis used to calculate angle offset $\Delta$ (and thereby translated first vector $\bar{y}_1$), is adjusted. The adjustment to the velocity hypothesis takes the form of a velocity offset. The adjustment may be made by using a coarse grid search over a large span of velocity hypotheses, and then a refined grid search in the vicinity of the most likely candidates. Alternatively, the adjustment may be made by an iterative gradient descent, i.e., starting from an initial guess, and each time through choose the next velocity step in a direction that reduces the velocity score.

Figure 8:
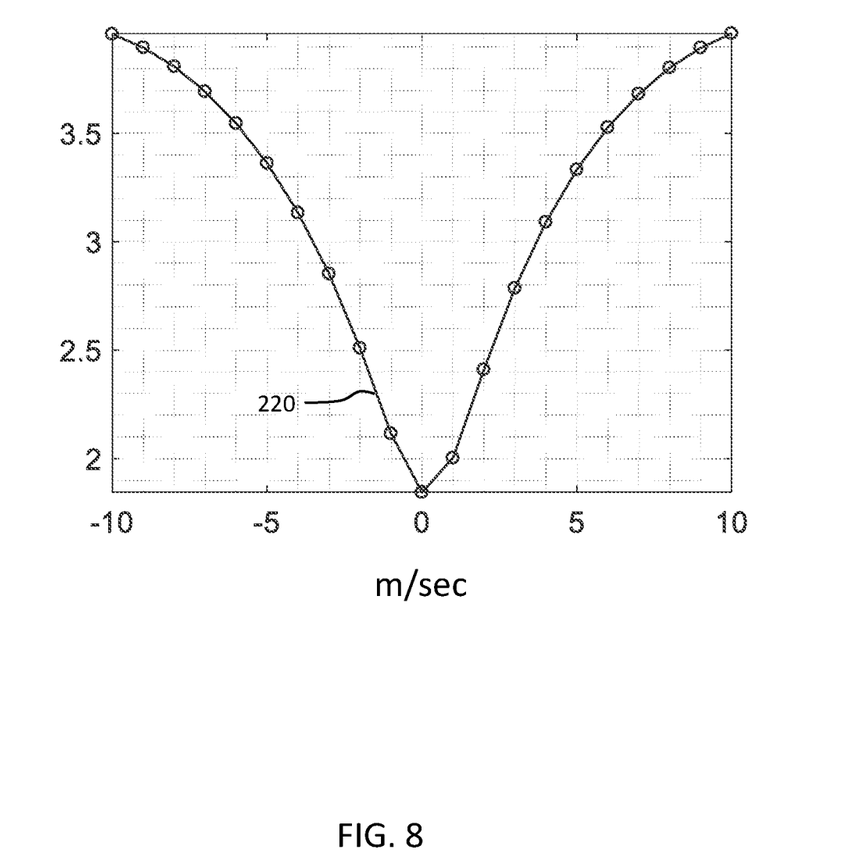
FIG. 8 is a graph showing a relationship between velocity score and velocity hypothesis according to an exemplary embodiment.

FIG. 8 shows an exemplary embodiment of an optimization process of the velocity hypothesis. Curve 220 shows a relationship between velocity score and velocity hypothesis in a hypothetical calculation. Each of the dots on curve 220 represents a velocity hypothesis for which the velocity score was calculated. The velocity hypothesis at the minimum of curve 220 is the optimal velocity hypothesis.

Returning to FIG. 5, once the velocity hypothesis is adjusted in block 122, the process returns to block 114, where a new translated first vector is calculated based on the adjusted velocity hypothesis; block 116, where a new beamforming spectrum is calculated based on the new translated first vector; and block 118, where a new velocity score is calculated based on the new beamforming spectrum.

Once a minimum velocity score is identified in block 120, the velocity hypothesis associated with the minimum velocity score is output as the optimal velocity hypothesis, and the beamforming spectrum associated with the minimum velocity score is output as the optimal beamforming spectrum. In block 124, peaks of the optimal beamforming spectrum are identified and may be output as the angular location of the detection targets 20, 22.

Figure 9:
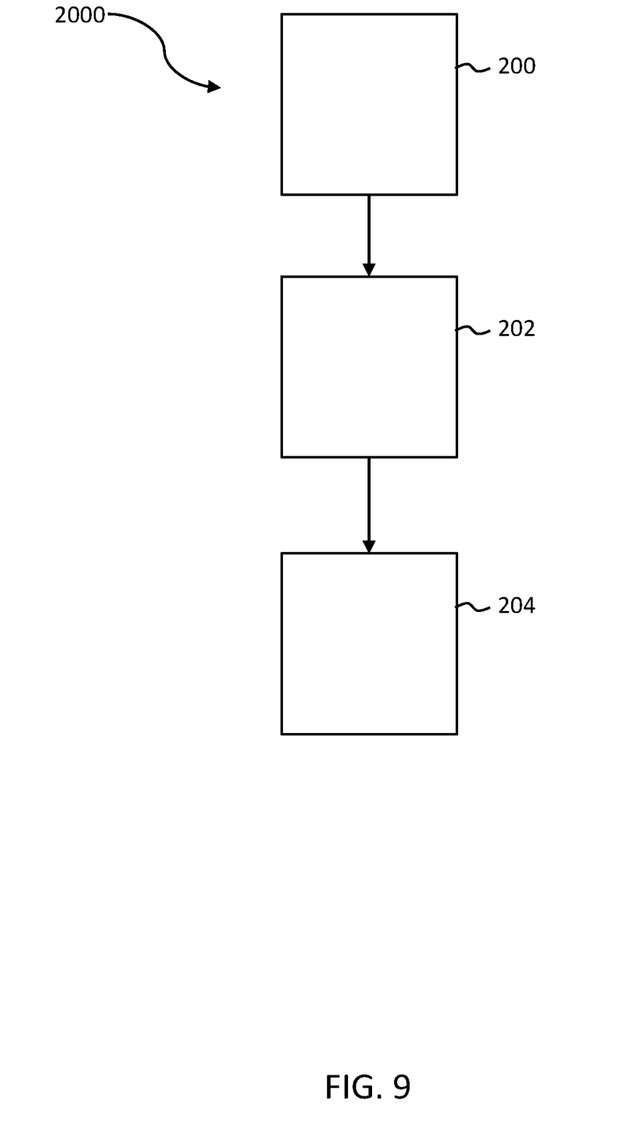
FIG. 9 is a flowchart illustrating an exemplary embodiment of controlling a vehicle based on an exemplary embodiment of a beamforming method.

FIG. 9 shows an exemplary embodiment of a method 2000 in which the beamforming method described herein can be used in the context of operating vehicle 10. In block 200, an optimal velocity hypothesis for vehicle 10 and angular locations of detection targets 20, 22 are calculated as discussed in detail herein and illustrated in FIG. 5. In block 202, radar system 14 transmits the optimal velocity hypothesis and angular locations to automated driving system 12. In block 204, automated driving system 12 adjusts control of vehicle 10 based on the optimal vehicle hypothesis and angular locations of detection targets 20, 22.

The exemplary embodiments described herein result in significant advantages over conventional systems and methods. For example, the exemplary embodiments make it possible for a radar system to resolve multiple targets within an angular resolution cell of the radar system. In other words, the exemplary embodiments functionally improve the angular resolution of a radar system based on relative motion of the radar system. In the context of autonomous vehicles, the improved angular resolution could allow improved autonomous operation in adverse weather conditions (e.g., rain, snow, fog) and at high speeds.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A radar system for use with multiple targets when there is relative motion between the radar system and the multiple targets, the radar system comprising:
an antenna structured to transmit a radar signal and receive reflected radar signals from targets; and
a processor operably connected to the antenna, the processor being configured to control the radar system to perform:
receiving a first reflected signal at a first time, the first reflected signal being characterized by a first vector having a first set of arrival angles;
receiving a second reflected signal at a second time, the second reflected signal being characterized by a second vector having a second set of arrival angles, the second set of arrival angles being equal to the first set of arrival angles plus an angle offset which is calculated based on a velocity hypothesis;
translating the first vector by applying the angle offset, thereby calculating a translated first vector;
calculating a beamforming spectrum based on the translated first vector and the second vector; and
identifying peaks in the beamforming spectrum to identify angular positions of the multiple targets.

2. The radar system of claim 1, wherein processor is configured such that the identifying peaks in the beamforming spectrum comprises:
calculating a velocity score of the beamforming spectrum;
iteratively adjusting the velocity hypothesis until an optimal velocity hypothesis is determined, the optimal velocity hypothesis being a velocity hypothesis for which the velocity score of the beamforming spectrum reaches a minimum velocity score, and an optimal beamforming spectrum being a beamforming spectrum generated using the optimal velocity hypothesis; and
identifying peaks in the optimal beamforming spectrum to identify angular positions of the multiple targets.

3. The radar system of claim 1, wherein the first vector is given by the equation:

$$y_1 = \sum_{m=0}^{M-1} a(\theta_m)c_m + v_1$$

wherein $y_1$ is the first vector, M is the number of reflections, $\theta_m$ is the m-th arrival angle, $a(\theta_m)=[e^{-j2\pi/\lambda x_1 \sin \theta_m} \ldots e^{-j2\pi/\lambda x_N \sin \theta_m}]^T$ is the array response at angle $\theta_m$ where $\lambda$ is a wavelength and $x_i$ is the i-th antenna position; $c_m$ is a complex reflection coefficient for the signal arriving from angle $\theta_m$, and $v_1$ is a first noise factor;
the second vector is given by the equation:

$$y_2 = \sum_{m=0}^{M-1} a(\theta_m + \Delta)b_m + v_2$$

wherein $y_2$ is the second vector, $\Delta$ is the angle offset, $a(\theta_m+\Delta)$ is an array response at angle $\theta_m+\Delta$, and $b_m$ is a complex reflector coefficient for the signal arriving from angle $\theta_m+\Delta$, and $v_2$ is a second noise factor.

4. The radar system of claim 3, wherein the translated first vector is given by the equation:

$$\bar{y}_1 = G(\Delta)y_1 \approx \sum_{m=0}^{M-1} a(\theta_m + \Delta)c_m + v_1$$

wherein $\bar{y}_1$ is the translated first vector, and $G(\Delta)$ is a diagonal matrix given by the equation:

$$G(\Delta)=\text{diag}\{e^{j2\pi \sin \Delta/\lambda x_1}, \ldots, e^{j2\pi x_N \sin \Delta/\lambda}\}$$

wherein the radar system comprises N antenna elements, $\lambda$ is the wavelength; and $x_1, x_2, \ldots, x_N$ are positions of the N antenna elements.

5. The radar system of claim 1, wherein the beamforming spectrum is given by the equation:

$$P(\theta) = \frac{1}{a^H(\theta)(R + \sigma I)^{-1}a(\theta)}$$

wherein $P(\theta)$ is the beamforming spectrum, $a(\theta)$ is an array response at angle $\theta$, $\sigma$ is a regularization factor, I is an identity matrix, superscript H represents a Hermitian transpose, and R is given by the equation:

$$R = \bar{y}_1 \bar{y}_1^H + y_2 y_2^H$$

wherein $\bar{y}_1$ is the translated first vector and $y_2$ is the second vector.

6. The radar system of claim 2, wherein the velocity score is given by the equation:

$$S_E = E - \alpha \sum_\theta |P(\theta)|^2$$

wherein $P(\theta)$ is the beamforming spectrum; $\alpha$ is a normalization factor given by the equation:

$$\alpha = \frac{0.25 \log(N)}{\max_\theta (P(\theta))},$$

where N is the number of beamforming angles, $\max_\theta$ is a function returning a maximum over all $\theta$, and E is given by the equation:

$$E = -\sum_\theta \gamma_\theta \log(\gamma_\theta)$$

wherein $\gamma_\theta$ is given by the equation:

$$\gamma_\theta = \frac{|P(\theta)|^2}{\Sigma_\theta |P(\theta)|^2}.$$

7. The radar system of claim 2, wherein the processor is further configured to:
output the optimal velocity hypothesis as an estimated velocity vector corresponding to relative motion between the radar system and the multiple targets; and
output angles corresponding to the peaks in the optimal beamforming spectrum as an estimated angular location of the multiple targets.

8. The radar system of claim 7, wherein the antenna and the processor are provided in a vehicle comprising an automated driving system operably connected to the radar system, the automated driving system being structured to autonomously control the vehicle;
the processor is configured to transmit the estimated velocity vector and the estimated angular positions of the multiple targets to the automated driving system; and
the automated driving system is structured to control operation of the vehicle based on the estimated velocity vector and the estimated angular positions of the multiple targets.

9. A vehicle comprising:
an automated driving system structured to autonomously control the vehicle;
a radar system operably connected to the automated driving system, the radar system being structured for use with multiple targets when there is relative motion between the radar system and the multiple targets;

wherein the radar system comprises:
an antenna structured to transmit a radar signal and receive reflected radar signals from targets; and
a processor operably connected to the antenna, the processor being configured to control the radar system to perform:
receiving a first reflected signal at a first time, the first reflected signal being characterized by a first vector having a first set of arrival angles;
receiving a second reflected signal at a second time, the second reflected signal being characterized by a second vector having a second set of arrival angles, the second set of arrival angles being equal to the first set of arrival angles plus an angle offset which is calculated based on a velocity hypothesis;
translating the first vector by applying the angle offset, thereby calculating a translated first vector;
calculating a beamforming spectrum based on the translated first vector and the second vector;
identifying peaks in the beamforming spectrum to identify angular positions of the multiple targets;
transmit the velocity hypothesis to the autonomous driving system as an estimated velocity vector; and
transmit the angular positions of the multiple targets to the autonomous driving system;
wherein the automated driving system is structured to control operation of the vehicle based on the estimated velocity vector and the angular positions of the multiple targets.

10. The vehicle of claim 9, wherein the processor is configured such that the identifying peaks in the beamforming spectrum comprises:
calculating a velocity score of the beamforming spectrum;
iteratively adjusting the velocity hypothesis until an optimal velocity hypothesis is determined, the optimal velocity hypothesis being a velocity hypothesis for which the velocity score of the beamforming spectrum reaches a minimum velocity score, and an optimal beamforming spectrum being a beamforming spectrum generated using the optimal velocity hypothesis; and
identifying peaks in the optimal beamforming spectrum to identify angular positions of the multiple targets.

11. A beamforming method for a radar system for use with multiple targets when there is relative motion between the radar system and the multiple targets, the beamforming method comprising:
receiving, with the radar system, a first reflected signal at a first time, the first reflected signal being characterized by a first vector having a first set of arrival angles;
receiving, with the radar system, a second reflected signal at a second time, the second reflected signal being characterized by a second vector having a second set of arrival angles, the second set of arrival angles being equal to the first set of arrival angles plus an angle offset which is calculated based on a velocity hypothesis;
translating the first vector by applying the angle offset, thereby calculating a translated first vector;
calculating a beamforming spectrum based on the translated first vector and the second vector; and
identifying peaks in the beamforming spectrum to identify angular positions of the multiple targets.

12. The beamforming method of claim 11, wherein the identifying peaks in the beamforming spectrum comprises:
calculating a velocity score of the beamforming spectrum;

iteratively adjusting the velocity hypothesis until an optimal velocity hypothesis is determined, the optimal velocity hypothesis being a velocity hypothesis for which the velocity score of the beamforming spectrum reaches a minimum velocity score, and an optimal beamforming spectrum being a beamforming spectrum generated using the optimal velocity hypothesis; and identifying peaks in the optimal beamforming spectrum to identify angular positions of the multiple targets.

13. The beamforming method of claim 11, wherein the first vector is given by the equation:

$$y_1 = \sum_{m=0}^{M-1} a(\theta_m)c_m + v_1$$

wherein $y_1$ is the first vector, M is the number of reflections, $\theta_m$ is the m-th arrival angle, $a(\theta_m)=[e^{-j2\pi/\lambda x_1 \sin \theta_m} \ldots e^{-j2\pi/\lambda x_N \sin \theta_m}]^T$ is the array response at angle $\theta_m$ where $\lambda$ is a wavelength and $x_i$ is the i-th antenna position; $c_m$ is a complex reflection coefficient for the signal arriving from angle $\theta_m$, and $v_1$ is a first noise factor; and the second vector is given by the equation:

$$y_2 = \sum_{m=0}^{M-1} a(\theta_m + \Delta)b_m + v_2$$

wherein $y_2$ is the second vector, $\Delta$ is the angle offset, $a(\theta_m+\Delta)$ is an array response at angle $\theta_m+\Delta$, and $b_m$ is a complex reflector coefficient for the signal arriving from angle $\theta_m$, and $v_2$ is a second noise factor.

14. The beamforming method of claim 13, the translated first vector is given by the equation:

$$\bar{y}_1 = G(\Delta)y_1 \approx \sum_{m=0}^{M-1} a(\theta_m + \Delta)c_m + v_1$$

wherein $\bar{y}_1$ is the translated first vector, and $G(\Delta)$ is a diagonal matrix by the equation:

$$G(\Delta) = \text{diag}\{e^{j2\pi/\lambda x_1 \sin \Delta}, \ldots, e^{j2\pi/\lambda x_N \sin \Delta}\}$$

wherein the radar system comprises N antenna elements, $\lambda$ is the wavelength; and $x_1, x_2, \ldots, x_N$ are positions of the N antenna elements.

15. The beamforming method of claim 11, wherein the beamforming spectrum is given by the equation:

$$P(\theta) = \frac{1}{a^H(\theta)(R+\sigma I)^{-1}a(\theta)}$$

wherein $P(\theta)$ is the beamforming spectrum, $a(\theta)$ is an array response at angle $\theta$, $\sigma$ is a regularization factor, I is an identity matrix, superscript H represents a Hermitian transpose, and R is given by the equation:

$$R = \bar{y}_1\bar{y}_1^H + y_2 y_2^H$$

wherein $\bar{y}_1$ is the translated first vector and $y_2$ is the second vector.

16. The beamforming method of claim 12, wherein the velocity score is given by the equation:

$$S_E = E - \alpha \sum_\theta |P(\theta)|^2$$

wherein $P(\theta)$ is the beamforming spectrum; $\alpha$ is a normalization factor given by the equation:

$$\alpha = \frac{0.25\log(N)}{\max_\theta(P(\theta))},$$

wherein N is the number of beamforming angles, $\max_\theta$ is a function returning a maximum over all $\theta$, and E is given by the equation:

$$E = -\sum_\theta \gamma_\theta \log(\gamma_\theta)$$

wherein $\gamma_\theta$ is given by the equation:

$$\gamma_\theta = \frac{|P(\theta)|^2}{\Sigma_\theta |P(\theta)|^2}.$$

17. The beamforming method of claim 12, wherein the optimal velocity hypothesis is reported as an estimated velocity vector corresponding to relative motion between the radar system and the multiple targets and angles corresponding to the peaks in the optimal beamforming spectrum are reported as the estimated angular location of the multiple targets.

18. The beamforming method of claim 17, further comprising providing the radar system in a vehicle comprising an automated driving system operably connected to the radar system, the automated driving system being structured to autonomously control the vehicle;

transmitting the estimated velocity vector and the estimated angular positions of the multiple targets to the automated driving system; and controlling operation of the vehicle based on the estimated velocity vector and the estimated angular positions of the multiple targets.

* * * * *